(12) United States Patent
Mikulandric

(10) Patent No.: US 12,467,242 B2
(45) Date of Patent: Nov. 11, 2025

(54) DEVICE AND METHOD TO EXTRACT WATER FROM HUMID AMBIENT AIR

(71) Applicant: ATLAS COPCO AIRPOWER, NAAMLOZE VENNOOTSCHAP, Wilrijk (BE)

(72) Inventor: Robert Mikulandric, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 442 days.

(21) Appl. No.: 17/921,133

(22) PCT Filed: Jun. 3, 2021

(86) PCT No.: PCT/IB2021/054870
§ 371 (c)(1),
(2) Date: Oct. 25, 2022

(87) PCT Pub. No.: WO2021/255568
PCT Pub. Date: Dec. 23, 2021

(65) Prior Publication Data
US 2023/0211255 A1 Jul. 6, 2023

(30) Foreign Application Priority Data
Jun. 16, 2020 (BE) .................... 2020/5434

(51) Int. Cl.
*E03B 3/28* (2006.01)
*B01D 5/00* (2006.01)
*B01D 53/26* (2006.01)

(52) U.S. Cl.
CPC .............. *E03B 3/28* (2013.01); *B01D 5/0039* (2013.01); *B01D 5/0054* (2013.01); *B01D 5/0087* (2013.01); *B01D 53/265* (2013.01)

(58) Field of Classification Search
None
See application file for complete search history.

(56) References Cited

U.S. PATENT DOCUMENTS 5,553,459 A 9/1996 Harrison
2004/0244398 A1 12/2004 Radermacher et al.

FOREIGN PATENT DOCUMENTS

CN 204212217 U * 3/2015
DE 3344033 A1 6/1985
(Continued)

OTHER PUBLICATIONS

DE102017108170A1_ENG (Espacenet machine translation of Lenz) (Year: 2018).*

(Continued)

*Primary Examiner* — Gabriel E Gitman
(74) *Attorney, Agent, or Firm* — BACON&THOMAS,PLLC

(57) ABSTRACT

Device for extracting water from humid ambient air, the device including a conduit in which successively is incorporated: a compressor to compress the humid ambient air into compressed ambient air, a first condenser to dry the compressed ambient air into dry compressed air, an expansion valve or expander for expanding the dry compressed air into dry expanded air and a second condenser. The first condenser is further configured to direct the wet ambient air through it as coolant for extracting water from the compressed ambient air in a first stage via an outlet or the like. The second condenser is configured to direct the dry expanded air through it as coolant for extracting the water from the humid ambient air in a second stage by means of an outlet or the like.

14 Claims, 3 Drawing Sheets

(56) References Cited

FOREIGN PATENT DOCUMENTS

DE       102017108170 A1 * 10/2018  ............ B01D 53/06
ES           1214585 U * 6/2018
WO    WO-2017181439 A1 * 10/2017  ............ B01D 53/26

OTHER PUBLICATIONS

WO2017181439A1_ENG (Espacenet machine translation of Yin) (Year: 2017).*
ES1214585U_ENG_WIPO (WIPO machine translation of Munoz Saiz (Year: 2018).*
CN204212217U_ENG (Espacenet machine translation of Bao) (Year: 2015).*
International Search Report and Written Opinion in corresponding PCT Application No. PCT/IB2021/054870, dated Oct. 1, 2021.
BE Search Report in corresponding BE Application No. 202005434, dated Feb. 24, 2021.
First Chinese Office Action with translation cited in corresponding Chinese Appln. No. 202180041602.X dated May 22, 2025.

* cited by examiner

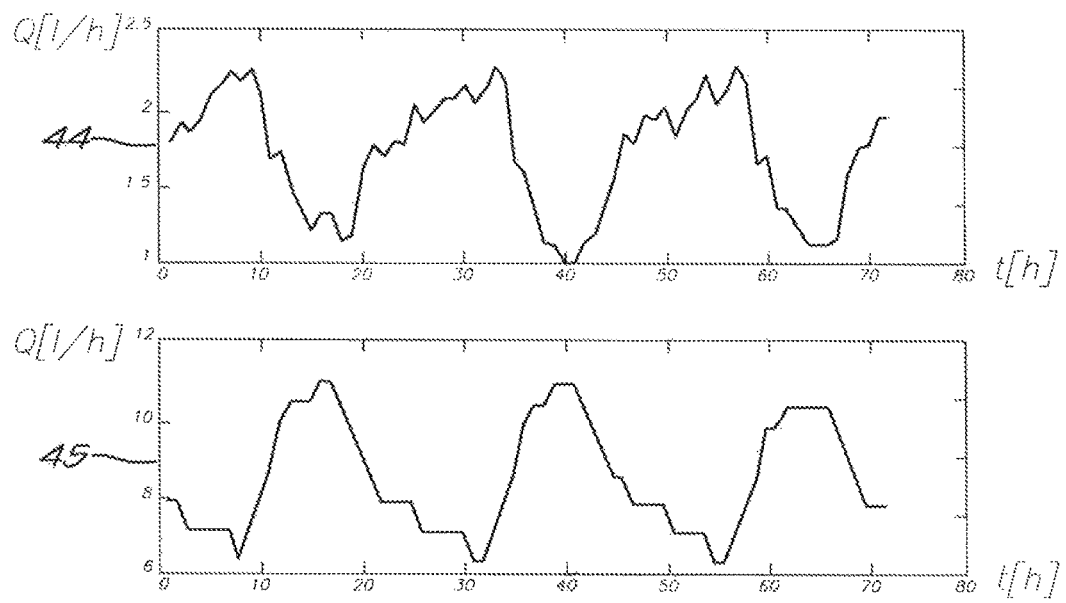
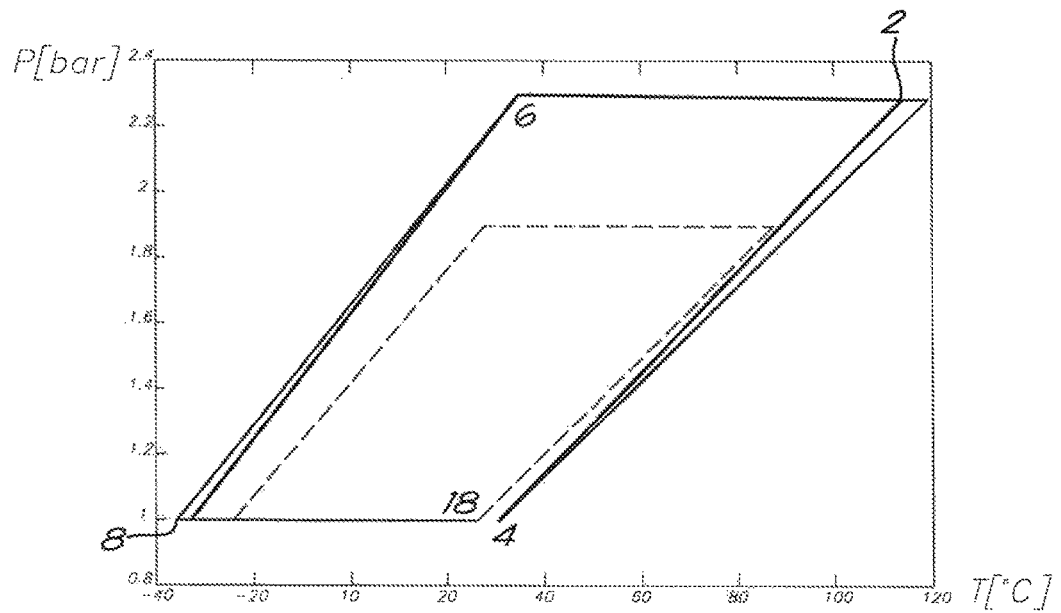
Fig.5
Fig.6

DEVICE AND METHOD TO EXTRACT WATER FROM HUMID AMBIENT AIR

FIELD OF THE INVENTION

The present invention relates to a device for extracting water from humid ambient air.

More specifically, the invention is intended for generating potable water using ambient air.

BACKGROUND OF THE INVENTION

Devices are already known for generating potable water, such as, for example, water purification plants or desalination plants.

Such known installations have the drawback that, for this purpose, impure liquid water is required.

Atmospheric water generators are also known, which require energy and humid ambient air to generate saline and/or potable water.

This has the advantage that such generators can be used on locations where there is little or no impure liquid water present.

Passive systems are known which do not require electrical or mechanical external energy.

A disadvantage is that they require a large space and surface area, making them unsuitable for large-scale water production.

Active systems are also known, which are able to generate a cooling capacity using electrical or mechanical energy to cool ambient air to below the dew point.

Such systems use a cooling circuit comprising a coolant or refrigerant, such as, for example, fluorocarbons.

The efficiency of such a cooling circuit decreases sharply when the difference between the ambient temperature and the cooling temperature increases.

In environments with high ambient temperatures and low humidity and hence a low dew point, the efficiency of such systems is therefore relatively low.

In addition, the liquid coolants used are often harmful to the environment.

SUMMARY OF THE INVENTION

The present invention aims to provide a solution to at least one of the aforementioned and other drawbacks.

The present invention has as object a device for extracting water from humid ambient air, and has as object a method for extracting water from humid ambient air.

Alternatively formulated, the device comprises a conduit in which successively is incorporated: a compressor having an inlet for humid ambient air, a primary portion of a first condenser, an expander and secondary portion of a second condenser, wherein a secondary portion of the first condenser is configured to direct humid ambient air through it as coolant, wherein a primary portion of the second condenser is configured to direct humid, ambient air to be dried through it.

In this device water will be generated at two locations, namely in a first stage and in a second stage. The air drawn in and compressed by the compressor will be cooled in the first condenser by the ambient air, whereby water will be separated off. This is possible because, together with the pressure, also the temperature of the ambient air increases due to the compression. The compressed ambient air will therefore have a higher temperature compared to the non-compressed ambient air. This non-compressed ambient air can subsequently be used as coolant to cool the compressed ambient air. The cooling will continue until the dew point such that water is extracted from the compressed ambient air in a first stage. The compressed ambient air is thereby dried into dried compressed air.

It should therefore be further understood that preferably no phase change occurs during the compression of the humid ambient air.

In a next step, the dried compressed air is expanded into dry expanded air. Due to the expansion, the temperature will decrease again, that is, the temperature of the expanded air will be lower than the dried compressed air.

After expansion, this dried and expanded air is then used as cooling air or coolant in the second condenser, separating off water from the again humid ambient air flowing through this second condenser.

An advantage is that no liquid, harmful coolant is required, but that ambient air is used for cooling. The device is therefore safer for man and environment.

Another advantage is that the performance or efficiency of such a device is comparable to known devices, even when the ambient temperature is high, but that the proposed solution is much cheaper and thus economically much more interesting.

Yet another advantage consists in that such a device is very simple and cheap to produce. Moreover, the cost per generated amount of water is also lower.

This is, on the one hand, because there is no need for a liquid harmful coolant, which entails strict safety requirements, but on the other hand also because the device does not comprise a closed cycle.

According to an embodiment, an inlet conduit is connected to an inlet of the primary portion of the second condenser, wherein a primary portion of a first heat exchanger is incorporated, wherein an outlet of the primary portion of the second condenser is connected to the inlet of a secondary portion of the first heat exchanger via a first conduit, wherein an outlet of the secondary portion of the second condenser is connected to the inlet of the secondary portion of the first heat exchanger via a second conduit.

According to an embodiment, a secondary portion of a second heat exchanger is incorporated into said second conduit, wherein the primary portion of this second heat exchanger is incorporated in said inlet conduit, between the primary portion of the first heat exchanger and the primary portion of the second condenser.

According to an embodiment, the expander is provided with a generator for generating energy, which generator is coupled to a drive of the compressor for supplying it with energy.

BRIEF DESCRIPTION OF THE DRAWINGS

In order to better demonstrate the features of the invention, some preferred embodiments of a device and method according to the invention for extracting water from humid ambient air are described below, by way of example without any limiting character, with reference to the accompanying drawings, in which:

FIG. 5 shows water production in the first and second condenser during the method;

FIG. 6 shows a simplified p-T diagram of the method.

DETAILED DESCRIPTION OF THE INVENTION

Figure 1:
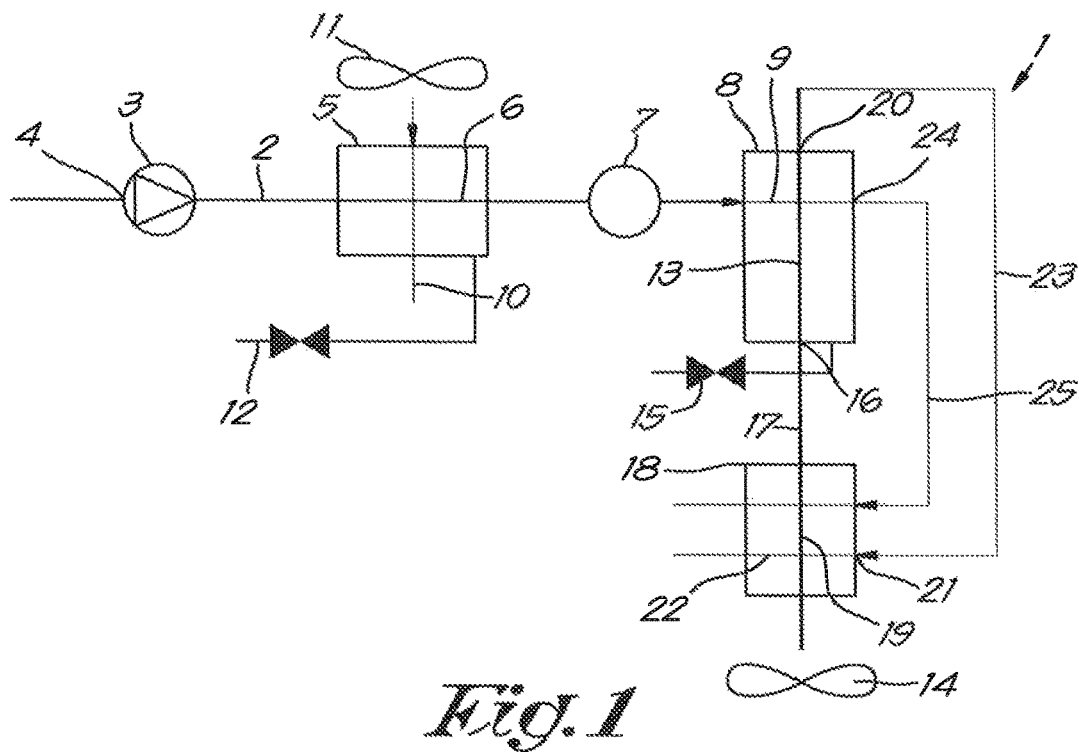
FIG. 1 schematically shows a device according to the invention.

The device shown schematically in FIG. 1 for generating water according to the invention comprises a conduit 2 in which the following elements are successively incorporated:

a compressor 3, with an inlet 4 for humid ambient air;
a primary portion 6 of a first condenser 5;
an expander 7;
a secondary portion 9 of a second condenser 8.

Said compressor 3 is in this case, but not necessarily, an oil-free compressor 3. This has the advantage that no oil can end up in the air and the condensate separated therefrom.

The secondary portion 10 of the first condenser 5 is configured to direct humid ambient air there through as coolant.

To this end, in this case, but not necessarily for the invention, a fan, such as a first fan 11, is provided.

Furthermore, the first condenser 5 is provided with a drain 12 for condensate formed in the primary portion in the first stage, to extract water from the humid ambient air.

The primary portion 13 of the second condenser 8 is configured to direct humid ambient air to be dried through it.

This means that the expanded, dried air will serve as cooling air in this second condenser 8.

In order to be able to direct the humid ambient air to be dried through the primary portion 13 of the second condenser 8, a second fan, in this case fan 14, is provided. This second fan 14 is also not necessary for the invention.

Thus, both the first fan 11 and the second fan 14 may be replaced, for example, by a blower or any other type of machine, configured to cause a flow. The first fan 11 and second fan 14 may also comprise the same machine and effect the flow in the first condenser 5 and the second condenser 8 via a set of flow guides.

The second condenser 8 is, just like the first condenser 5, provided with a drain 15 for condensate formed in the primary portion 13 in a second stage for extracting water from humid ambient air.

In this case, but not necessarily, an inlet conduit 17 is connected to the inlet 16 of the primary portion 13 of the second condenser 8 in which a primary portion 19 of a first heat exchanger 18 is incorporated.

The outlet 20 of the primary portion 13 of the second condenser 8 is connected to the inlet 21 of the secondary portion 22 of the heat exchanger 18 via a first conduit 23.

The outlet 24 of the secondary portion 9 of the second condenser 8 is also connected to the inlet 21 of the secondary portion 22 of the heat exchanger 18 via a second conduit 25.

The operation of the device 1 is as follows.

The compressor 3 will draw in and compress humid ambient air, causing it to heat up.

This warm, humid, compressed air then passes through the primary portion 6 of the first condenser 5, where it is cooled by ambient air, using the first fan 11, to its dew point.

Condensate, i.e. water, will be formed here, which is removed from the device 1 via the outlet 12. This is a first point or stage at which water is produced or generated.

The dried air is then expanded via the expander or the expansion valve 7 and further cooled by this expansion.

This expanded air has a lower temperature than the ambient air and is directed through the secondary portion 9 of the second condenser 8 to cool humid ambient air to below the dew point.

This humid ambient air is directed through the primary portion 13 of this second condenser 8, wherein it first passes through the primary portion 19 of the heat exchanger 18. To this end, use will be made here of the second fan 14.

When cooling the humid ambient air in the second condenser 8, condensate will be formed in a second point or stage, which is removed from the device 1 via the outlet 15. This is a second point at which water is produced or generated.

Both the expanded air, which emerges from the secondary portion 9 of the second condenser 8, and the dried air, which emerges from the primary portion 13 of the second condenser 8, have a temperature around the dew point of the ambient air.

Both gases are directed via the first conduit 23 and second conduit 25 to the secondary portion 22 of the heat exchanger 18.

Hereby, a first cooling of the humid ambient air will already take place before the cooling to the dew point takes place in the second condenser 8.

The air which is used for cooling in the first condenser 5 and in the heat exchanger 18 is afterwards simply vented into the atmosphere.

Figure 2:
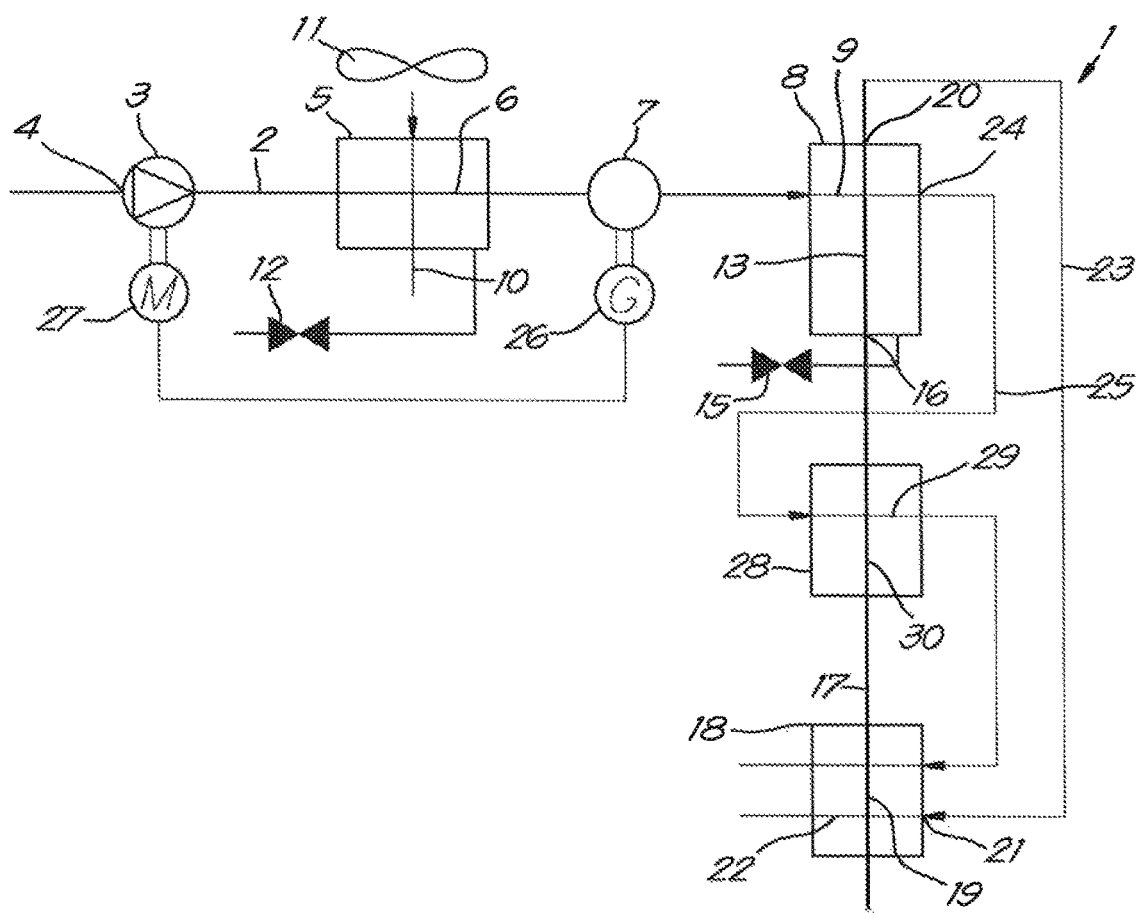
FIG. 2 shows a variant of FIG. 1.

In FIG. 2 an alternative arrangement is shown.

Hereby, the expander 7 is provided with a generator 26 for generating energy.

The generator 26 will be driven by the expander 7 during the expansion process such as to recover energy from the expansion process.

The generator 26 is coupled to a drive 27 of the compressor 3 in order to supply it, whether or not partially, with energy. The remaining energy demand of the generator can then be met, for example, via solar panels. Furthermore, the generator may also provide energy for the first 11 and/or the second 14 ventilator.

In this way, the energy, which is generated during the expansion process, is optimally recovered.

Of course, it cannot be excluded that the generator 26 supplies the generated energy to an electricity grid.

Furthermore, in FIG. 2 a second heat exchanger 28 is also provided.

The secondary portion 29 of this second heat exchanger 28 is incorporated into said second conduit 25, wherein the primary portion 30 of this second heat exchanger 28 is incorporated into said inlet conduit 17, between the primary portion 19 of the first heat exchanger 18 and the primary portion 13 of the second condenser 8.

In this way, the humid ambient air, which is directed to the second condenser 8 via the inlet conduit 17, will undergo an additional cooling in the second heat exchanger 28 after a first cooling in the first heat exchanger 18.

The expanded gas entering the second conduit 25 from the secondary portion 9 of the second condenser 8, will first provide for a cooling in the second heat exchanger 28 and subsequently in the first heat exchanger 18.

Of course, it is also possible that more than two of such heat exchangers 18, 28 are provided.

The operation of this device 1 is further analogous to the device 1 shown in FIG. 1.

The features of the invention are further illustrated using process parameters of the method as illustrated in FIGS. 3 through 6.

Figure 3:
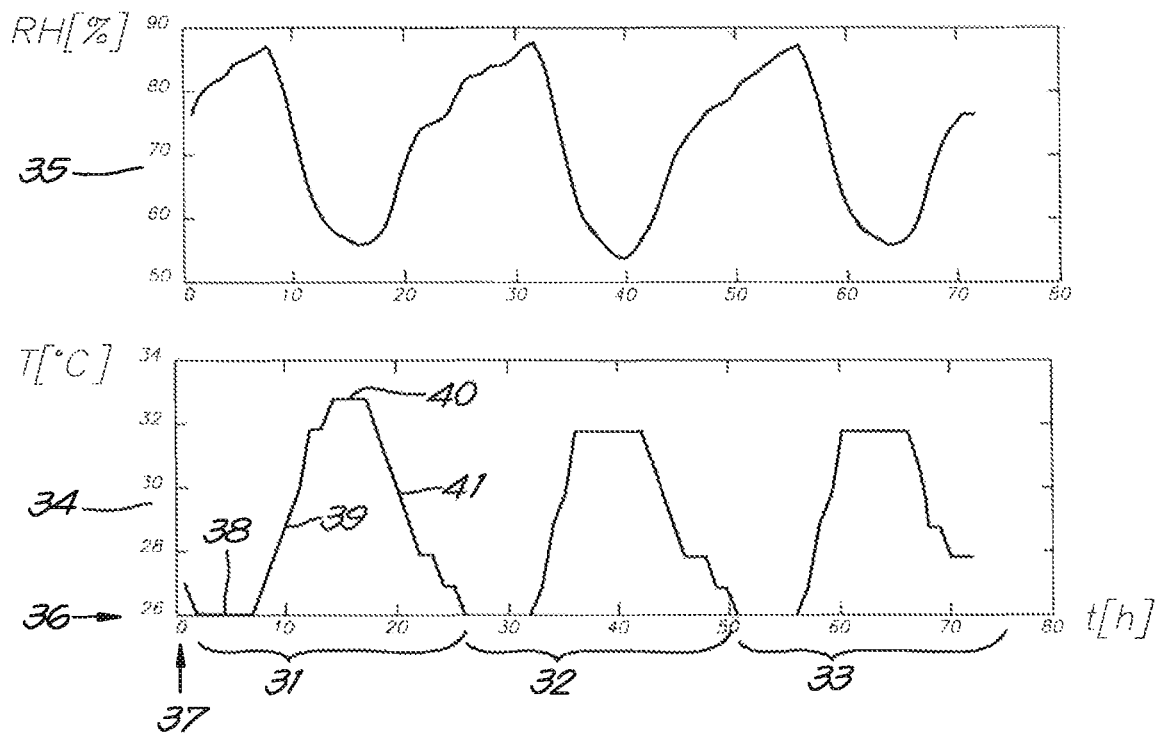
FIG. 3 shows meteorological data of humid ambient air.

FIG. 3 illustrates the temperature 34 and the relative humidity 35 of humid ambient air over three consecutive twenty-four hours 31, 32, 33 in a humid environment. The horizontal axis 3 illustrates 36 hours over the consecutive twenty-four hours, starting at midnight 37. In the FIGS. 4 and 5, the same horizontal axis is plotted against other operating parameters illustrating the method.

At the point in time 37 the temperature 34 starts to decrease to a minimum 38, which is maintained for a certain period of time. Thereafter, the temperature increases 39 up to a maximum 40 in order then to decrease 41 again.

As illustrated in FIG. 3, the temperature follows certain repeated cycles of increase and decrease, wherein it should be further understood that every twenty-four hours in itself is unique. Furthermore, this pattern is dependent of a geographical location and climatologic period.

Furthermore, FIG. 3 illustrates a relative humidity 35 of the ambient air in a similar manner as the temperature 34. Here, too, a repetitive pattern can be recognized which is also dependent on a geographical location and climatological period.

Figure 4:
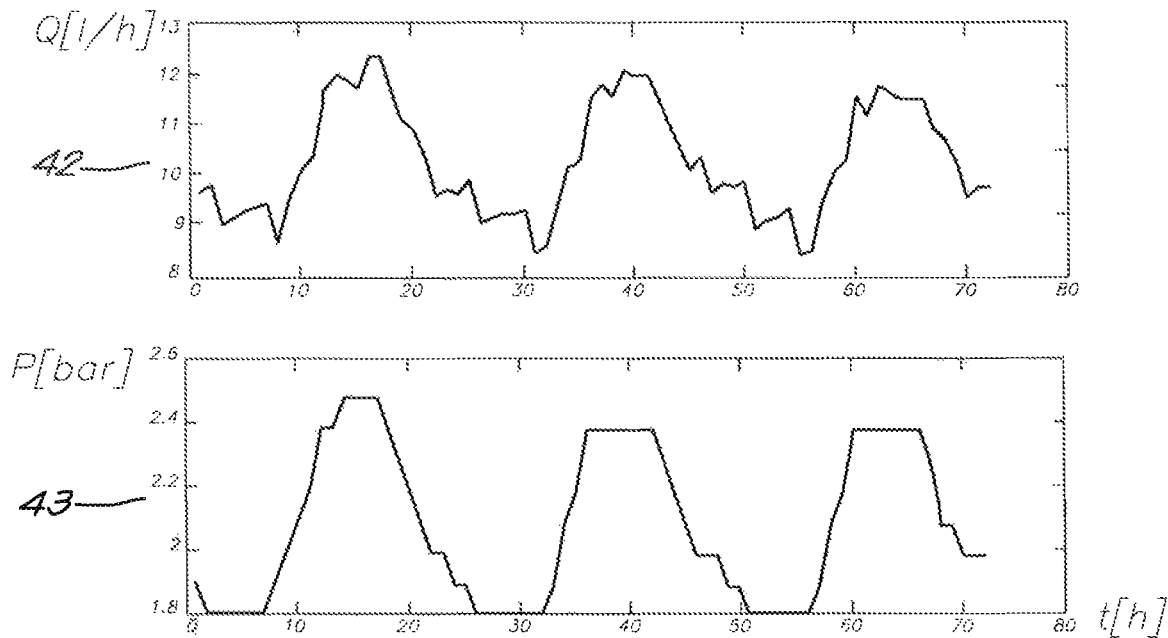
FIG. 4 shows total water production and system pressure during the method.

FIG. 4 further illustrates the total water production 42 and the maximum system pressure 43 during the method of extracting water from the humid ambient air according to an embodiment of the invention. It should further be noted that the illustration of the water production 42 and the maximum system pressure 43 in FIG. 4 is related to the meteorological data illustrated in FIG. 3. Notably, as already mentioned, the twenty-four hours illustrated on the horizontal axes in FIG. 3 corresponds to the twenty-four hours illustrated on the horizontal axes in FIG. 4.

From the illustration in FIG. 4 it can be derived that there exists approximately a linear relationship between the water production 42 and the maximum system pressure 43 at comparable points in time.

In FIG. 5, the water production is further split up according to the first condenser 5, graph 44 and the second condenser 8, graph 45.

In FIG. 6, a p,T-diagram is illustrated, which is representative for the method of extracting water from humid ambient air, as shown in the graphs of FIGS. 3 to 5. Here, different states per point in time during the first twenty-four hours 31 are displayed. The dashed line corresponds to six hours, the thick line to twelve hours and the normal line to eighteen hours. The designated numbers in FIG. 6 correspond to the locations with the same reference number in the device according to the invention of, for example, FIG. 1. That is, the number 8 in FIG. 6 represents the condition in the second condenser 8 of FIG. 1.

Finally, the method will be illustrated using equations expressing the working parameters.

The ambient conditions and in particular the absolute humidity can be expressed as function of the relative humidity $RH_{amb}$, the ambient pressure $p_{amb}$, and the ambient temperature $T_{amb}$:

$$\text{total\_absolute\_humidity} = f(RH_{amb}, p_{amb}, T_{amb}) \quad \text{(Equation 1)}$$

The output temperature $T_2$ of the compressor 3 and hence the input of the first condenser 5 is:

$$T_2 = T_{amb} \times (p_2/p_{amb})^{((\kappa-1)/\kappa)} \quad \text{(Equation 2)}$$

where $p_2$ is the output pressure of the compressor 3 and $\kappa$ is the compression modulus.

The dew point $T_{dew\_2}$, this is the temperature at which condensation occurs, is then:

$$T_{dew\_2} = T_3 = f(RH_2, p_2) \quad \text{(Equation 3)}$$

wherein $RH_2$ is the relative humidity after the compressor 3.

The temperature $T_{2\_air}$ of the air in the condenser 5 is:

$$T_{2\_air} = T_{amb} + \Delta T_{contribution\_condenser} \quad \text{(Equation 4)}$$

where $T_{2\_air} \leq T_{dew\_2}$.

The relative humidity $RH_2$ and free water content free_water$_2$ in the compressed air are then:

$$RH_2 = f(\text{total\_absolute\_humidity}, p_2, T_{2\_air}), \quad \text{(Equation 5)}$$

$$\text{free\_water}_2 = f(RH_2, p_2, T_{2\_air}) \quad \text{(Equation 6)}$$

The amount of extracted water $m_{water\_condenser}$ from the compressed air in the condenser 5 is then:

$$m_{water\_condenser} = m_{air} \times (\text{free\_water}_2/(1+\text{total\_absolute\_humidity})) \quad \text{(Equation 7)}$$

with $m_{air}$ the total amount of air.

The required power P for the first condenser 5 is then:

$$p = m_{air} \times cp_{air} \times (T_2 - T_3) + M_{water\_condenser} \times r_{condensation} \quad \text{(Equation 8)}$$

The pressure $p_3$ at the expander 7, this is the output of the first condenser 5, is:

$$p_3 \approx p_2 \quad \text{(Equation 9)}$$

and the pressure $p_4$ and temperature $T_4$ at the output of the expander 7 are $$p_4 \approx p_{ambient}, \quad \text{(Equation 10)}$$

$$T_4 = T_3 \times (p_4/p_3)^{((\kappa-1)/\kappa)} \quad \text{(Equation 11)}$$

The temperature $T_{dew\_4}$ in the second condenser 8, which is the same as the dew point of the ambient air, is:

$$T_{dew\_4} = T_{4\_air} = f(RH_4, p_4) \quad \text{(Equation 12)}$$

where $T_{4\_air} \geq T_4 + \Delta T_{contribution\_condenser4}$.

The relative humidity $RH_4$ and amount of free water content free_water$_4$ in the ambient air that is directed towards the second condenser 8 are then:

$$RH_4 = f(\text{total\_absolute\_humidity}, p_4, T_{4\_air}), \quad \text{(Equation 13)}$$

$$\text{free\_water}_4 = f(RH_4, p_4, T_{4\_air}) \quad \text{(Equation 14)}$$

The amount of extracted water $m_{water\_condenser}$ of the ambient air in the second condenser 8 is then:

$$m_{water\_condenser} = m_{air\_4} \times (\text{free\_water}_4/(1+\text{total\_absolute\_humidity})) \quad \text{(Equation 15)}$$

The required power P for the second condenser 8 is then:

$$p = m_{air} \times cp_{air} \times (T_{amb} - T_4) = m_{water\_condenser} \times r_{condensation} + m_{air\_4} \times cp_{air} \times (T_{amb} - T_4) \quad \text{(Equation 16)}$$

For a moderate maritime climate such as in Belgium, this gives the following values by way of illustration:

$p_{amb}$=1 bar;
$T_{amb}$≈2-12° C.;
$RH_{amb}$≈70-100%;
$p_2$≈2-3.5 bar;
$T_2$≈60-130° C.;
$p_3$≈2-3.5 bar (before expander 7);
$T_3$≈10-26° C. (before expander 7);
$RH_4$≈40% (after expander 7);
$p_4$≈1 bar (after expander 7);
$T_4$≈−60 to −35° C.;
$T_5$≈−5° C. (dried air after condenser 9).

The total water production in the first condenser 5 is then 0-5 litres per hour and the total water production in the second condenser 8 is then 40-50 litres per hour.

The present invention is by no means limited to the embodiments described by way of example and shown in the figures, but a device and method according to the invention for extracting water from humid ambient air can be realized in all kinds of variants without going beyond the scope of the invention.

The invention claimed is:

1. A device for extracting water from humid ambient air, the device comprising a conduit in which successively are incorporated:
    a compressor to compress a first stream of humid ambient air into compressed ambient air,
    a first condenser to dry the compressed ambient air into dry compressed air,
    an expansion valve or expander for expanding the dry compressed air into dry expanded air, and
    a second condenser,
    wherein the first condenser is further configured to direct a second stream of humid ambient air through it as a coolant for extracting water from the compressed ambient air in a first stage via an outlet, and
    wherein the second condenser is configured to direct the dry expanded air through it as a coolant for extracting additional water from a third stream of humid ambient air in a second stage by means of an outlet.

2. The device according to claim 1, further comprising a fan configured to create a flow of the second and/or third stream of humid ambient air through the first and/or second condenser.

3. The device according to claim 2, further comprising a first heat exchanger configured to exchange heat between on the one hand:
    the dry expanded air after the second condenser and/or the third stream of humid ambient air after extraction of water in the second stage; and on the other hand:
    the third stream of humid ambient air before extracting water in the second stage.

4. The device according to claim 3, further comprising a second heat exchanger, configured to exchange heat between on the one hand:
    the expanded ambient air after the second condenser and before the first heat exchanger; and on the other hand:
    the third stream of humid ambient air before the second condenser and after the first heat exchanger.

5. The device according to claim 4, wherein the fan is further configured to create a flow of the third stream of humid ambient air through the first and/or second heat exchanger.

6. The device according to claim 1, further comprising a generator coupled to the expansion valve or expander and configured to generate energy during the expansion of the dry compressed ambient air.

7. The device according to claim 6, wherein the generator is coupled to a drive of the compressor.

8. The device according to claim 1, wherein the compressor is an oil-free compressor.

9. A method for extracting water from humid ambient air, the method comprising the steps of:
    compressing a first stream of humid ambient air into compressed ambient air; and
    drying the compressed ambient air into dry compressed ambient air by extracting water in a first stage from the compressed ambient air by cooling it by means of a second stream of humid ambient air;
    expanding the dry compressed ambient air into dry expanded air; and
    extracting water in a second stage from a third stream of humid ambient air by cooling it by means of the dry expanded air.

10. The method according to claim 9, further comprising the step of:
    exchanging heat between on the one hand:
    the dry expanded air in combination with the third stream of humid ambient air after extracting water in the second stage; and on the other hand:
    the third stream of humid ambient air before extracting water in the second stage.

11. The method according to claim 9, wherein the step of compressing the first stream of humid ambient air includes a step of controlling a pressure of the compressed ambient air dependent on a relative humidity of the first stream of humid ambient air to control a dew point of the compressed ambient air.

12. The method according to claim 9, wherein a pressure of the dry expanded air is greater than a pressure of the third stream of humid ambient air.

13. The method according to claim 9, further comprising the step of:
    controlling a fan for cooling the compressed ambient air and/or the third stream of humid ambient air, wherein a rotational speed of the fan depends on a temperature of the first, second, and/or third streams of humid ambient air and the dew point of the first and/or third streams of humid ambient air.

14. A device for extracting water from humid ambient air, the device comprising a conduit in which successively are incorporated:
    a compressor to compress a first stream of humid ambient air into compressed ambient air,
    a first condenser to dry the compressed ambient air into dry compressed air,
    an expander for expanding the dry compressed air into dry expanded air, and
    a second condenser,
    wherein the first condenser is further configured to direct a second stream of humid ambient air through it as a coolant for extracting water from the compressed ambient air in a first stage via an outlet, and
    wherein the second condenser is configured to direct the dry expanded air through it as a coolant for extracting water from a third stream of humid ambient air in a second stage by means of an outlet.

* * * * *